United States Patent [19]
Hoffman et al.

[11] 3,903,641
[45] Sept. 9, 1975

[54] MOISTURE RESPONSIVE TILTING PLANTER

[76] Inventors: Louis S. Hoffman, Evans Farm Rd., Morristown, N.J. 08057; Harry Spruyt, 419 E. 91st St., New York, N.Y. 10009

[22] Filed: Aug. 31, 1973

[21] Appl. No.: 393,447

[52] U.S. Cl. ............ 47/34; 34/89; 47/38; 116/114 R; 220/69
[51] Int. Cl.² ............ A01G 9/02; A01G 27/00; G01D 13/00
[58] Field of Search ...... 47/38, 38.1, 34, 34.1; 220/69; 34/89, 238; 116/114 R; 248/364

[56] References Cited
UNITED STATES PATENTS

| | | | |
|---|---|---|---|
| 1,967,424 | 7/1934 | Nevitt | 34/89 X |
| 2,707,930 | 5/1955 | Miles | 220/69 UX |
| 3,751,852 | 8/1973 | Schrepper | 47/34.13 |
| 3,805,995 | 4/1974 | Lebel et al. | 116/114 R |

FOREIGN PATENTS OR APPLICATIONS

| | | | |
|---|---|---|---|
| 550,799 | 6/1931 | Germany | 47/39 |
| G12,545 | 3/1956 | Germany | 47/38.1 |
| 83,441 | 5/1935 | Sweden | 47/38.1 |
| 841,340 | 5/1939 | France | 47/38.1 |
| 1,286,921 | 1/1962 | France | 116/114 R |
| 1,116,889 | 2/1956 | France | 116/114 R |
| 672,714 | 5/1952 | United Kingdom | 47/38 |

*Primary Examiner*—Edgar S. Burr
*Assistant Examiner*—Steven A. Bratlie

[57] ABSTRACT

A planter includes an elongate tray having a planting area for containing soil and plants, a weight positioned in the tray adjacent one far end thereof and a projection associated with the bottom surface of the tray and disposed between the far ends thereof for acting as a fulcrum when the tray is placed upon a supporting surface. The weight and the position of the projection are chosen such that the center of gravity of the planter is on the opposite side of the projection from the weight when the soil contains sufficient moisture, and is on the weight side of the projection when the soil contains insufficient moisture. The planter occupies a first predetermined position when the soil contains sufficient moisture, and tilts downwardly on the weight side of the projection when the soil contains insufficient moisture to thereby indicate that additional moisture is required.

5 Claims, 4 Drawing Figures

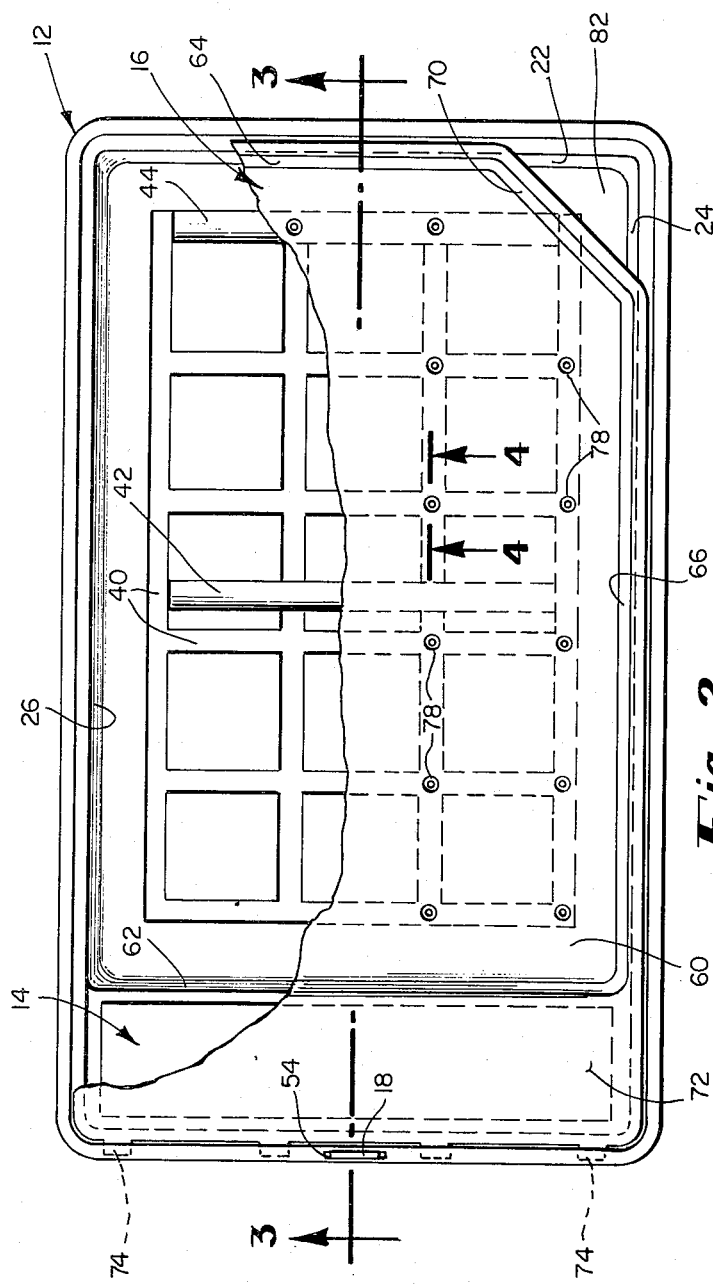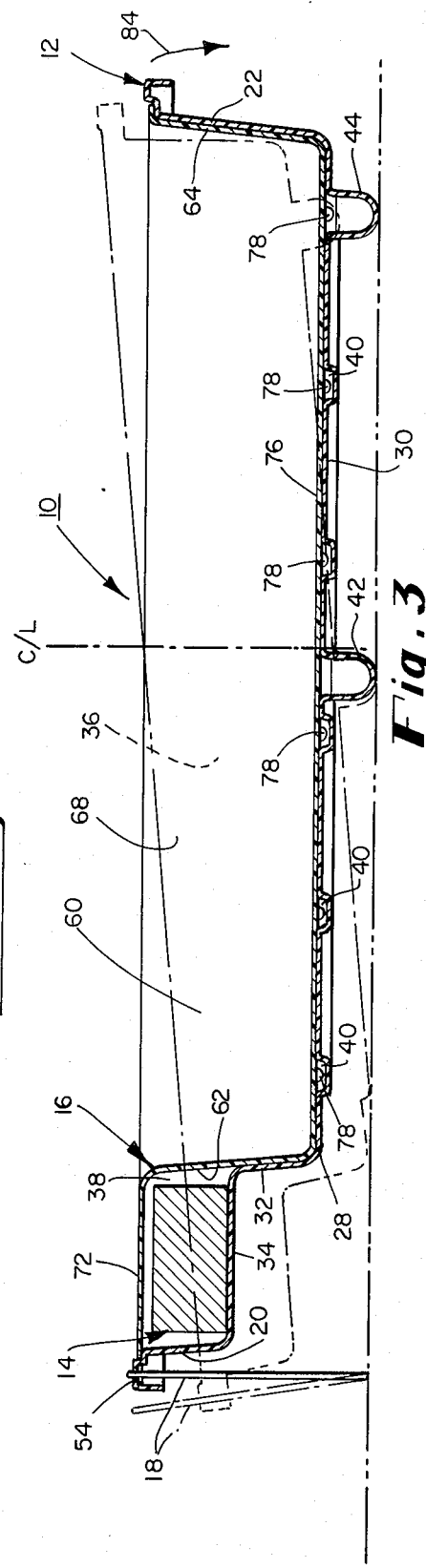

MOISTURE RESPONSIVE TILTING PLANTER

BACKGROUND OF THE INVENTION

1. Field of the Invention

This invention relates to a planter, and more specifically to a planter which tilts in response to a weight loss resulting from the evaporation of a quantity of moisture which brings the moisture content of soil contained within the planter below an acceptable level.

2. Description of the Prior Art

It is common practice to add water, or other suitable liquid, to planters at some arbitrarily set time interval. The use of an arbitrarily set time interval for adding liquid to a planter is necessary when the planter does not include any means for indicating when the moisture content is below an acceptable level. In such instances, if the arbitrary time interval is too long, the growth of plants may be impaired, and in some instances the plants may die.

Planting systems including automatic watering devices are known in the prior art, as exemplified by U.S. Pat. No. 3,168,797, issued to Patassy, and U.S. Pat. No. 1,555,675, issued to Kruszynski. These systems include one or more planters containing soil therein, and these planters are supported by fairly complicated structures which include a water supply, and means for actuating a valve associated with the water supply in response to a loss of planter weight resulting from evaporation of moisture therein to permit the addition of water into the planters from the water supply. These planting systems may be highly desirable for sophisticated agricultural experiments in which a substantially uniform moisture content must be maintained. However, the complex construction of these automatic watering devices renders them less suitable for non-technical uses wherein a substantially uniform moisture content need not be maintained. However, even in the simplest of planters, it is desirable to employ some means for indicating that the moisture content has dissipated to an unacceptably low level as a result of evaporation. It is to this type of planter that the instant invention is directed.

SUMMARY OF THE INVENTION

A planter of this invention includes an elongate tray having a planting area therein. A weight is included at one far end of the tray, and a projection is associated with the bottom wall of the tray and is disposed intermediate the far ends thereof. The projection extends generally downwardly and functions as a fulcrum when the tray is placed on a supporting surface. The weight and the position of the projection are chosen such that the center of gravity of the planter containing moistened soil in the planting area shifts to the weight side of the projection from the opposite side of the projection when the moisture content of the soil drops below a certain level as a result of evaporation. When the center of gravity shifts, the planter will tilt downwardly on the weight side of the projection to thereby indicate that moisture should be added to the soil.

In the preferred embodiment of this invention, a second projection is associated with the bottom wall and is positioned on the side of the fulcrum projection opposite the side containing the weight. This second projection extends generally downwardly for substantially the same distance as the fulcrum projection to position the planter in a generally horizontal plane when the moisture content of the soil is at, or above, an acceptable level, and the planter is supported on a generally horizontal surface. To further explain, when the moisture content is at, or above, an acceptable level, the center of gravity of the planter will be on the side of the fulcrum projection opposite the weight side, and this opposite side of the planter will therefore tend to tilt downwardly. However, the second projection will prevent tilting beyond a substantially horizontal disposition of the planter when said planter is supported on a generally horizontal surface.

In a preferred embodiment of this invention, a moisture quantity signal indicator is employed in conjunction with the planter. This moisture quantity signal indicator includes indicia which is exposed when the planter tilts downwardly on the weight side thereof to thereby provide a visible indicator that the moisture content is below an acceptable level, and that moisture should be added to the planter.

In a preferred embodiment of this invention, the planter includes an insert associated with the tray. The insert includes a section which overlies the weight, and cooperates with the tray to provide an enclosed weight compartment. In addition, the insert includes a planting compartment which is positioned in telescopic relationship within the planting area. The planting compartment of the insert includes orifices associated therewith which are in communication with fluid distribution channels in the planting area of the tray to permit fluid in the channels to enter the planting compartment of the insert for adding moisture to soil contained within said planting compartment.

Other objects and advantages of this invention will become apparent upon reading the detailed description of the invention in conjunction with the drawings.

BRIEF DESCRIPTION OF THE DRAWINGS

FIG. 2 is a plan view of a preferred planter according to this invention;

FIG. 3 is a sectional view taken along line 3—3 of FIG. 2, and showing a second position of the planter in phantom representation; and FIG. 4 is a sectional view along line 4—4 of FIG. 2.

DESCRIPTION OF THE PREFERRED EMBODIMENTS OF THE INVENTION

Figure 1:
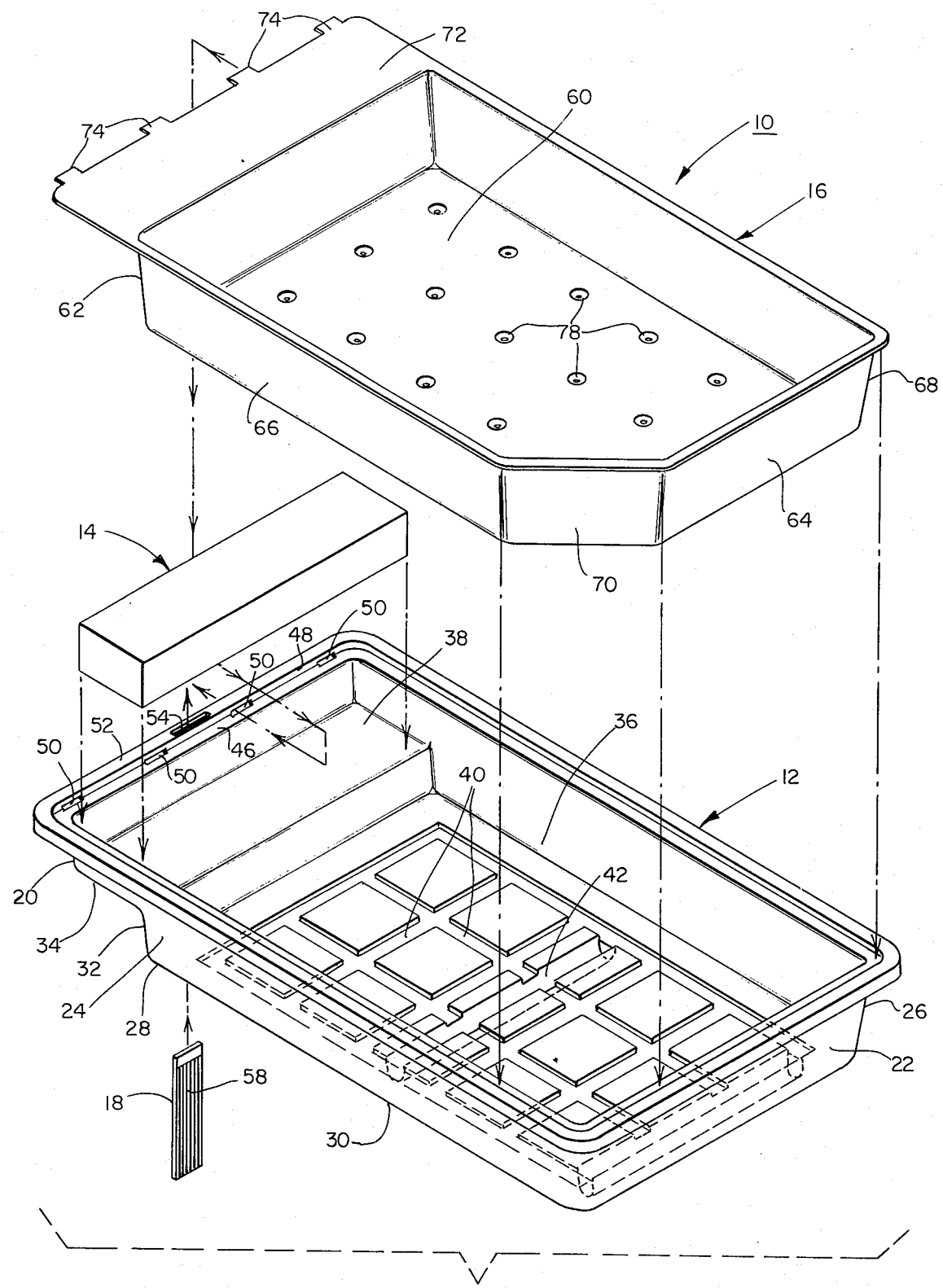
FIG. 1 is an exploded isometric view of a planter according to this invention, and showing a moisture quantity signal indicator utilized therewith.

Referring to FIG. 1, a preferred planter 10 of this invention includes an elongate tray 12, a weight 14 and an insert 16. Preferably, a moisture quantity signal indicator 18 is used with the planter 10. The construction of the moisture quantity signal indicator 18, and its mode of operation, will be described later in this application.

Referring to FIGS. 1 and 3, the tray 12 is substantially rectangular in plan view, and includes a long dimension defined between peripheral end walls 20 and 22, and a short dimension defined between peripheral side walls 24 and 26. The tray 12 further includes a bottom wall 28 having a stepped construction which includes a lower substantially horizontal section 30, an upwardly inclined section 32 and a substantially horizontal upper section 34. This stepped construction establishes a planting area 36 and a weight receiving area 38 within the tray 12. Fluid distribution channels 40 are integrally formed in the lower horizontal section 30 which constitutes the bottom of the planting area 36.

Referring to FIGS. 1 and 3, the tray 12 includes a downwardly extending projection 42 formed in the lower section 30 of bottom wall 28. This projection extends transversely across the horizontal section 30 between the peripheral side walls 24 and 26 of the tray, and is offset from the transversely extending center line, C/L, of the planting area 36 on the weight side of the tray 12. This projection 42 acts as a fulcrum, in a manner which will be described later in this application.

The tray 12 further includes a balance stop 44 which is also formed in the lower section 30 of the bottom wall 28. This balance stop extends downwardly, and is substantially of the same height as the projection 42. This balance stop 44 aids in establishing the orientation of planter 10 when soil contained therein has a sufficient moisture content, as will be explained in detail later in this application.

Referring to FIG. 1, the peripheral end and side walls of the tray 12 terminate at their upper end in outwardly directed flanges 46. The outwardly directed flanges are integrally formed with upwardly directed collars 48, and transversely spaced slits 50 are formed at the junction of a flange 46 and collar 48 at one end of the tray 12. The function of the slits 50 will be described later.

The upper end of the collars 48 are formed integrally with further outwardly extending flanges 52. The flange 52 adjacent one end of the tray 12 includes an elongate slit 54 therein for receiving the moisture quantity signal indicator 18. This indicator 18 includes indicia 58 thereon which is rendered visible, in a manner to be described later in this application, when moisture should be added to the soil in the planter 10.

Referring to FIGS. 1–3, the insert 16 includes a planting compartment 60 defined by peripheral end walls 62 and 64, peripheral side walls 66 and 68, and an inclined wall section 70. In addition, the insert 16 includes a horizontal section 72 which extends outwardly from the upper margin of end wall 62. When the insert 16 is assembled with the tray 12, the planting compartment 60 is disposed in telescopic relationship within the planting area 36 of the tray, and the horizontal section 72 of the insert overlies the weight receiving area 38 within the tray to establish a closed weight-containing compartment. Transversely spaced tabs 74 extend outwardly from the outermost end of the horizontal section 72, and are in alignment with the transversely spaced slits 50 in the tray 12 to be received therein and lock the insert 16 in its proper assembled condition with the tray 12.

Referring to FIGS. 1–4, the insert 16 includes a bottom wall 76 having a plurality of projections 78 integrally formed as a part thereof. The projections 78 have openings 80 (FIG. 4) extending completely therethrough to communicate with the interior of the planting compartment 60. In addition, the projections 78 are positioned to extend into the fluid distribution channels 40 in the bottom wall 28 of the tray 12 to establish communication between the openings 80 in the projection 78 and fluid contained within the distribution channels (FIGS. 2 and 3). The inclined wall section 70 of insert 16 bridges end wall 22 and side wall 24 of the tray 12 to provide a substantially triangular fill corner 82 through which liquid, such as water, can be added to the planter (FIG. 2).

Referring now to FIG. 3, the mode of operation of the planter 10 will be described. The weight 14 and the position of the fulcrum projection 42 are chosen such that the center of gravity of the planter is disposed on the side of projection 42 opposite to that of the weight when the soil has a suitable moisture content therein. In this manner, a moment is established about the pivot projection 42 which tends to cause the planter 10 to tilt downwardly in the direction indicated by arrow 84. However, the balance stop projection 44 prevents tilting of the planter past a horizontal disposition when the planter is supported on a horizontal surface.

As the moisture in the soil evaporates, the weight in the planting area 36 of the planter 10 is reduced. The weight loss per unit volume in the planting area resulting from evaporation of moisture is substantially uniform. However, since the pivot projection 42 is positioned on the weight side of the center line of the planting area, a greater total volume of fluid will evaporate on the side of projection 42 opposite the weight side, then will evaporate on the weight side. Accordingly, the greatest weight loss in the planter will occur on the side of projection 42 opposite the weight side. The projection 42 is suitably positioned so that the center of gravity of the planter 10 will shift to the weight side of the projection 42 when the moisture level in the soil drops below an acceptable level. When this occurs, a moment is created about pivot projection 42 which tilts the weight side of the planter 10 downwardly into the orientation shown in phantom representation in FIG. 3. When moisture is added to the soil through the fill corner 82, the center of gravity will shift back to the side of projection 42 opposite the weight side to cause the planter 10 to assume a horizontal orientation.

In the preferred embodiment of this invention, the indicia 58 contained on the moisture quantity signal indicator 18 is disposed so that it is below the elongate slit 54 when the planter 10 is in its horizontal position, and becomes exposed above the slit when the moisture content in the soil drops to an unacceptable level, and the planter 10 tilts to the orientation shown in phantom representation in FIG. 3. When the indicia is exposed above the slit 54 it can be visibly seen to signal the need for adding moisture to the planter.

Several modifications can be made within the scope of this invention. For example, the planter 10 need not be utilized in conjunction with a moisture quantity signal indicator 18. Also, the planter 10 can be employed without an insert 16, in which case the soil and moisture will be added directly into the planting area 36 of the tray 12. With respect to this latter point, reference in the claims to "planting section" is intended to include either the planting area of a tray or a planting compartment of an insert which is associated with the tray. Moreover, the tray 12 can have many different configurations; the sole criteria being that the center of gravity of the planter shift from one side of a fulcrum projection to the other side of said projection in response to a loss of weight within the planter resulting from evaporation of moisture which brings the moisture content of the soil below an acceptable level. The planter 10 of this invention can be prefilled with soil and sold as a single unit. In this manner, the planter will include the proper weight and fulcrum position for the particular soil composition.

Having described our invention, we claim:

1. The combination of a planter and moisture quantity signal indicator including:
   A. an elongate tray having a bottom wall and generally upwardly directed peripheral walls, a flange extending outwardly of a peripheral wall and including a slit therethrough, said tray including a planting section;
   B. a weight disposed within said tray adjacent the peripheral wall from which the flange with the slit therethrough extends;
   C. a moisture quantity signal indicator including a stem extending into the slit and having indicia thereon;
   D. a projection disposed intermediate the ends of the tray and extending generally downwardly from the bottom wall of the tray for acting as a fulcrum when the planter is placed on a supporting surface, said projection being positioned relative to the planting section such that the center of gravity of the planter containing soil therein is on the same side of the projection as the weight when the moisture content of the soil is below a certain level, and is on the opposite side of the projection when the moisture content is above said certain level, whereby the planter will be in a first predetermined position when the moisture content is above said certain level and will tilt downwardly on the same side of the projection as said weight when the moisture content drops below said certain level, said indicia on the stem of the moisture quantity signal indicator being disposed below the flange when the planter is in its first predetermined position and being disposed above said flange when said planter tilts downwardly to provide a visible indicator that the moisture content is below said certain level.

2. A planter comprising:
   A. an elongate tray including a bottom wall and generally upwardly directed peripheral end and side walls, said bottom wall being of a stepped configuration including a lower, substantially horizontal section which constitutes the bottom of a planting area, a generally upwardly inclined transition section extending from said lower section and constituting an end of the planting area and an upper, substantially horizontal section extending from the upper end of the inclined transition section and being disposed adjacent one peripheral end wall of said tray;
   B. a weight disposed on the upper section of the bottom wall;
   C. an insert having a soil receiving compartment formed by a bottom wall and generally upwardly directed peripheral walls, said compartment being disposed in telescopic relationship within the planting area of the tray, said insert further including a generally horizontally extending, outwardly directed extension from an upper margin of a peripheral wall thereof, said extension overlying the upper section of the bottom wall of the tray to establish a closed weight-containing compartment;
   D. a first projection intermediate the peripheral end walls of the tray and extending generally downwardly from the bottom wall of said tray for acting as a fulcrum when the planter is placed on a supporting surface, said projection being positioned relative to the planting area such that the center of gravity of the planter containing soil therein is on the same side of the projection as the weight when the moisture content of the soil is below a certain level, and is on the opposite side of the projection when the moisture content is above said certain level;
   E. a second projection extending downwardly from the bottom wall of said tray for substantially the same distance as the first projection, said second projection being disposed on the side of the first projection opposite from that of the weight, whereby the planter will tilt downwardly on the same side of the projection as said weight when the moisture content drops below said certain level, and will be disposed in a generally horizontal plane when the moisture content is above said certain level and the planter is supported on a generally horizontal surface.

3. The planter according to claim 2, wherein over 50% and less than 100% of the soil containing volume of the planting section is disposed between the projection and the end of the tray which is opposite the end of the tray to which the weight is adjacent.

4. The planter according to claim 2, wherein the lower section of the bottom wall has an inner surface including fluid distribution channels therein, the bottom wall of the insert including downwardly extending projections disposed within said fluid distribution channels, each projection including inner surface defining a continuous opening communicating with the fluid distribution channels of said tray and the soil receiving compartment of said insert.

5. The planter according to claim 4, wherein a peripheral wall of the insert is inclined with respect to adjacent peripheral walls of the tray to define an enlarged opening between the insert and the tray through which liquid can be added to the planter.

* * * * *